United States Patent

Faerber et al.

[11] Patent Number: 5,956,327
[45] Date of Patent: Sep. 21, 1999

[54] METHOD FOR ASSIGNING RADIO RESOURCES TO A PLURALITY OF TRANSMISSION DEVICES OF A BASE STATION WITHIN A RADIO COMMUNICATION SYSTEM

[75] Inventors: Michael Faerber, Wolfratshausen; Bruno Hoefer, Munich, both of Germany

[73] Assignee: Siemens Aktiengesellschaft, Munich, Germany

[21] Appl. No.: 08/717,600

[22] Filed: Sep. 23, 1996

[30] Foreign Application Priority Data

Sep. 22, 1995 [DE] Germany .......................... 195 35 360

[51] Int. Cl.⁶ .................................................. H04B 7/208
[52] U.S. Cl. .......................... 370/330; 455/450; 455/509
[58] Field of Search .................................... 370/321, 329, 370/332, 336, 337, 347, 348, 442, 443, 458, 478, 330, 334; 455/450, 451, 452, 453, 509, 516, 562

[56] References Cited

U.S. PATENT DOCUMENTS

| | | | |
|---|---|---|---|
| 5,021,801 | 6/1991 | Smith et al. | 455/562 |
| 5,048,116 | 9/1991 | Schaeffer | 455/562 |
| 5,267,262 | 11/1993 | Wheatley, III | 375/1 |
| 5,432,780 | 7/1995 | Smith et al. | 370/334 |
| 5,455,821 | 10/1995 | Scahaeffer et al. | 370/17 |
| 5,506,848 | 4/1996 | Drakopoulos et al. | 370/95.1 |
| 5,512,884 | 4/1996 | Hesse et al. | 640/825.03 |
| 5,513,183 | 4/1996 | Kay et al. | 370/95.3 |
| 5,542,093 | 7/1996 | Bodin et al. | 455/33.2 |
| 5,583,869 | 12/1996 | Grube et al. | 370/347 |
| 5,600,706 | 2/1997 | Dunn et al. | 379/59 |
| 5,774,790 | 6/1998 | Dupuy | 1/1 |

FOREIGN PATENT DOCUMENTS 0 647 982  12/1995  European Pat. Off. .

OTHER PUBLICATIONS

Motorola BSS Equipment Planning Guide 1992.

*Primary Examiner*—Chau Nguyen
*Attorney, Agent, or Firm*—Hill & Simpson

[57] ABSTRACT

The method addresses problems of limited radio resources, in particular with respect to the frequency channels in GSM mobile radio systems and the requirement for a high resource utilization rate even in base stations with a low number of radio resources, and thus severe fluctuations in efficiency when additional radio resources are added. The method makes available additional radio resources and apportions them, as required, to a plurality of radio coverage areas of a base station. The utilization of the radio resources is thus improved with little additional outlay on circuitry.

9 Claims, 6 Drawing Sheets

METHOD FOR ASSIGNING RADIO RESOURCES TO A PLURALITY OF TRANSMISSION DEVICES OF A BASE STATION WITHIN A RADIO COMMUNICATION SYSTEM

BACKGROUND OF THE INVENTION

In radio communication systems, at least a portion of the communication between two communication terminals which are connected by means of the radio communication system takes place via an air interface, that is, via a radio connection. Such an air interface has only limited radio resources. The radio resources, such as the extent of the frequency spectrum available and the time available must be assigned particularly effectively, in particular for the planning of a radio network.

The GSM mobile radio network is such a radio communication system in which the air interface lies between fixed base stations and mobile stations and regulates the communication between them. In this case, a base station has a plurality of transmission devices which each supply one radio coverage area with radio resources and which are provided for the communication with the mobile stations located in this radio coverage area. The radio resources of a transmission device constitute the frequency channels, at least one of which frequency channels is required for transmitting the system information and the time slots within a frequency channel which may be distributed over a plurality of mobile stations, that is to say over a plurality of communication terminals.

In a GSM network, area coverage is usually aimed at so that the radio coverage areas of the transmission devices of a base station as a rule form a zone of continuous coverage around the base station. The frequency channels used by the transmission devices in a base station must differ from one another in terms of frequency in order to prevent interference, in the same way as the frequency channels must differ from the frequency channels of adjacent radio coverage areas of other base stations, that is to say of other radio cells. Since only a specific bandwidth in the frequency spectrum is available to a network operator for the radio communication system, the operator is faced with the complex task of effectively apportioning the available radio resources, usually the frequency channels, to the base stations, and ultimately transmission devices, taking into account the traffic load values.

If the radio resources of a transmission device are completely utilized and there is a new resource request, for example, for a further call setup, additional spectrum resources must be made available to this radio coverage area. However, with the time slot multiplexing method, an additional frequency channel for this frequency coverage area means that a considerable overcapacity of radio resources (here time slots), which is not used, is offered for one call-setup request. This offered overcapacity for only one radio coverage area leads, in particular in the case of base stations in regions with low usage of the radio network, for example in rural regions where only a few frequency channels have to be offered, to a significant reduction in the efficiency of the utilization of the offered radio resources and thus to an ineffective apportionment of the radio resources.

Motorola "BSS Equipment Planning Guide" dated 1992 discloses a solution which makes it possible for the modules used to be utilized more efficiently. This is achieved in that an additional transmission device is assigned to a base station, which transmission device is capable of transmitting into, and receiving from, all the radio coverage areas realized by the base station and its transmission devices. However, a new additional frequency, that is to say an additional frequency channel, is assigned for each radio coverage area of the base station. The additional transmission device must therefore switch over between the frequency channels in accordance with the time slots. Thus, although the additional transmission device is utilized more efficiently since it is possible to fulfil resource requests from all the radio coverage areas associated with the base station, extensive utilization of additional spectrum resources (three additional frequency channels) occurs. The spectrum resources thus continue to be utilized inadequately.

SUMMARY OF THE INVENTION

It is an object of the present invention to apportion the radio resources to the transmission devices for base stations in radio systems such that a high resource utilization rate is made possible.

In general terms the present invention is a method for assigning radio resources to a plurality of transmission devices of a base station within a radio communication system. The transmission devices each realize a radio coverage area by a transmitting component and receiving component. Additional spectrum resources are provided which in the event of the previously available radio resources not being available, are assigned for common use for a further resource request at least for two of the transmission devices.

Advantageous developments of the method of the present invention are as follows.

The radio communication system is implemented as a radio system which is operated using a time slot multiplexing method and the additional spectrum resources provided are at least one additional frequency channel.

The transmission devices are operated using the time slot multiplexing method and the time slots of the at least one additional frequency channel are apportioned to the at least two transmission devices.

A frequency channel is additionally made available. The use of the additional frequency channel by the at least two transmission devices is restricted and the additional frequency channel is made available for supplying an individual radio coverage area.

In general terms the present invention is also a base station having a plurality of transmission devices within a radio communication system. The transmission devices each realize a radio coverage area. A transmitting component and receiving component are controlled by a control device. Additional spectrum resources which are realized by an additional transmission device are provided. They are assigned by the control device in the event of previously available radio resources not being available, for common use for a further resource request at least from two of the transmission devices.

Advantageous developments of the apparatus of the present invention are as follows.

In a radio system operated in time slot multiplexing method, the additionally provided spectrum resources has at least one additional frequency channel whose time slots are apportioned to the at least two transmission devices.

An additional transmission device generates a frequency channel and is connected in the transmitting component to a coaxial switch. It is provided for the common use of the additional frequency channel by the at least two transmission devices and switches over the transmission energy in accordance with the time slots. The coaxial switch is connected in each case to the transmission devices of additional associated ring feeders or couplers. The transmission energy of the at least one additional frequency channel is thus combined in the ring feeders or couplers with the transmission energies of the respective transmission device.

An additional transmission device generates a frequency channel and is connected in the transmitting component to an additional phase-controlled array antenna. Under the control of the control device, the array antenna can switch over the additional frequency channel between the radio coverage areas of at least two transmission devices in accordance with the time slots.

An additional transmission device, which generates a frequency channel and which is connected in the transmitting component in each case to a power divider, is provided so that the transmission energy of the additional frequency channel is apportioned via the power divider to at least two further transmission devices via a power divider or a PIN diode before output amplification in the transmitting component. Ring feeders or couplers which are connected to the power divider or the PIN diode are provided in the other transmission devices, in which ring feeders or couplers the transmission energy of the additional frequency channel is combined in each case with the transmission energies of the respective transmission devices, after which the transmission energies are subjected in each case to output amplification in a linear power amplifier.

The control device is constructed such that the addition of the at least one additional frequency channel to a specific radio coverage area is controlled by the control device.

An additional frequency channel is switched, by the control device as a replacement for a frequency channel which transmits the system information and which has been lost.

An additional antenna is provided so that an additional frequency channel is evaluated in the receiving component by the additional antenna which realizes the radio coverage areas of at least two transmission devices, and by a corresponding evaluation circuit.

A ring feeder, which is tuned to the frequency of the additional frequency channel, is connected to the transmission devices. Here the received signals of an additional frequency channel are combined after broadband reception in the respective transmission device is provided in the receiving component.

Provided in the receiving component is a PIN diode which, after broadband reception in the respective transmission device, combines the received signals of an additional frequency channel, controlled in accordance with the time slots by the control device, for further evaluation.

An aspect which is important to the present invention is the provision of additional spectrum resources which, in the case of a further resource request, when the previously available radio resources are not available for at least two of the transmission devices of the base station are apportioned for common use. This means that the additional spectrum resources are utilized more efficiently by their simultaneous use for a plurality of radio coverage areas.

For a network operator, for example, in a GSM network, this means that, for example for a region in his radio network which is supplied by a base station with three sectorized transmission devices which each have a frequency channel, the network operator can cope with small overload peaks by assigning an additional frequency channel for all three radio coverage areas with the aid of a minimum of additional spectrum resources. The method according to the invention is suitable in particular for use in GSM or DECT mobile radio systems in which the spectrum resources are realized by frequency channels, a frequency channel being subdivided into a plurality of time slots (time slot multiplexing method) which can in turn be distributed over various communication connections. Thus, it is possible for the apportionment of an additional frequency channel to a plurality of radio coverage areas to be realized by distributing time slots in an extremely simple way.

According to a further advantageous refinement of the method according to the present invention, a "single" further frequency channel is made additionally available. The method according to the present invention can be used particularly advantageously if only small radio resources are to be used. Since precisely the addition of a second frequency channel entails a considerable reduction in the efficiency of the handling of the spectrum resources, the assignment of one additional frequency channel to a plurality of radio coverage areas permits the decline in efficiency to be made smaller.

The possibility of enabling an additional frequency channel to be used for a plurality of radio coverage areas can also be utilized to the effect that this additional frequency channel can be used as a backup channel in the event of the loss of one frequency channel, which carries the system information, of one of the transmission devices already present. The radio communication system thus makes advantageous gains in terms of operational reliability.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGS. of which like reference numerals identify like elements, and in which:

DESCRIPTION OF THE PREFERRED EMBODIMENTS

Figure 2:
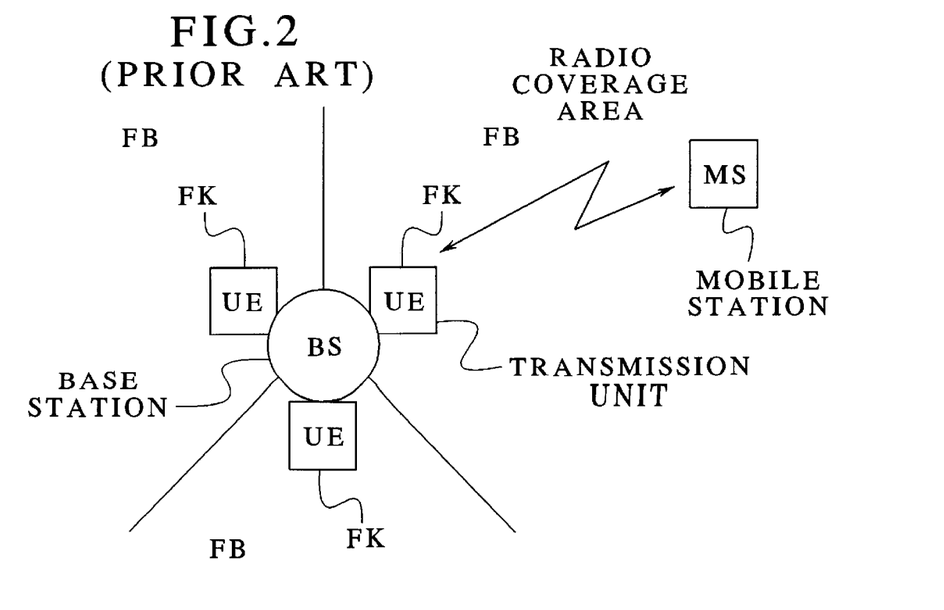
FIG. 2 shows a base station according to the prior art with associated radio coverage areas.

In FIG. 2, the sectorizing apportionment of the coverage provided by a base station BS into, for example, three radio coverage areas FB, which is part of the prior art, is clarified. Associated with the base station BS are three transmission units UE which each make available a frequency channel FK in order to realize the associated radio coverage area FB. The base station BS is, for example, part of a GSM mobile radio system in which each frequency channel FK is subdivided into eight or 16 time slots (full-rate or half-rate) and each time slot can be assigned to another mobile station MS as a communication terminal of the radio system. The base station BS is connected to a mobile station MS via a transmission device UE and an air interface and thus permits a communication connection to be made from the mobile station MS to other terminals in the communication network.

Figure 1A:
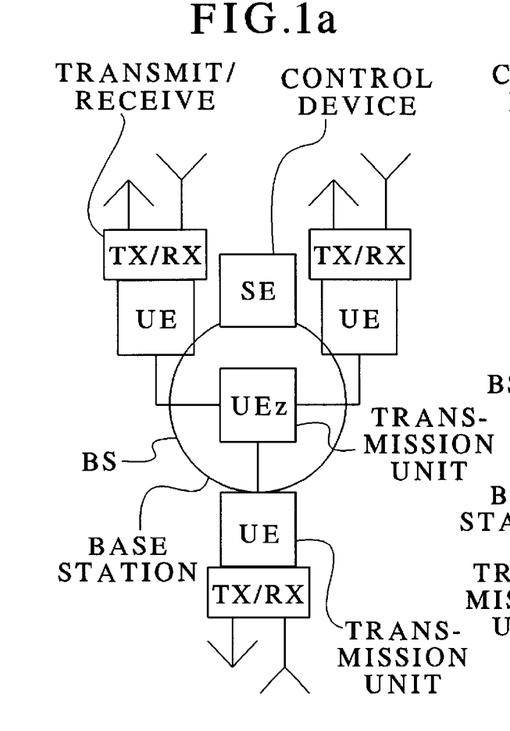
FIGS. 1a and 1b show base stations with associated devices for realizing the radio coverage areas, in particular an additional transmission device.
Figure 1B:
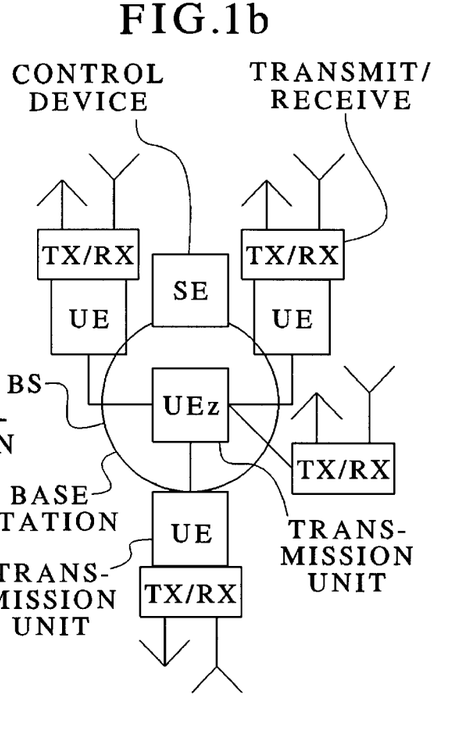

In FIGS. 1a and 1b it is indicated how a base station BS is extended according to the present invention by means of an additional transmission unit UEz in order to make available an additional frequency channel FK. The base station BS is controlled here by means of a control device SE. In this case, there are two solutions which differ in principle, corresponding to FIGS. 1a and 1b. In FIG. 1a, the transmission device UE each have a transmitting and receiving component TX/RX with the associated antenna elements for broadcasting and receiving the transmission and reception energy. The additional transmission device UEz uses the transmitting and receiving components TX/RX of the other transmission devices UE in order to realize the additional frequency channel FKz see FIG. 3b. In contrast with this, the additional transmission device UEz has, in accordance with FIG. 1b, a separate transmitting and receiving component TX/RX for broadcasting the transmission energy or for receiving the reception energy of the additional frequency channel FKz.

Figure 3A:
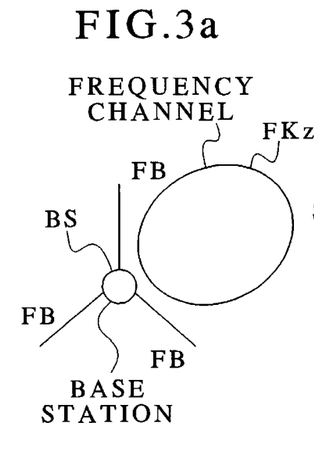
FIGS. 3a, 3b and 3c show various possible ways of apportioning an additional spectrum resource to one or more radio coverage areas.
Figure 3B:
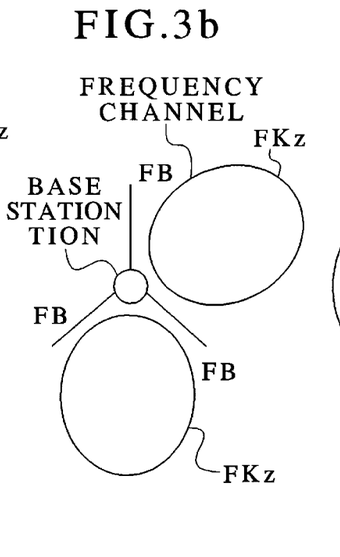
Figure 3C:
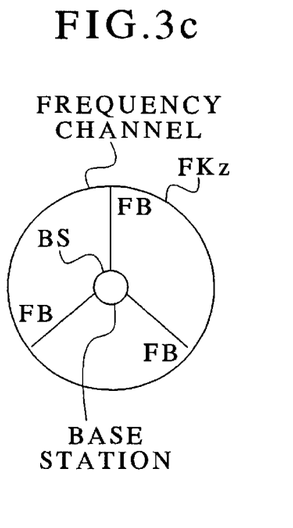

In this case, as illustrated in FIGS. 3a, 3b and 3c, an additional frequency channel FKz can be apportioned to the radio coverage areas FB in a completely different way in order to supplement the already existing spectrum resources FK. For a base station BS with three sectors, that is to say three radio coverage areas FB, an additional frequency channel FKz in accordance with FIG. 3b, or 3c, is assigned to a plurality of radio coverage areas FB. This means that the additional frequency channel FKz realizes two or three radio coverage areas FB. FIG. 3a indicates the case in which owing to the loss of one or more frequency channels FK of a radio coverage area FB, the possibility of ensuring the functioning of the radio communication system in this radio coverage area FB is at risk so that the additional frequency channel FKz, which is in principle provided for supplying a plurality of radio coverage areas FB, is used to replace the lost frequency channels FK in only one radio coverage area FB.

Figure 4:
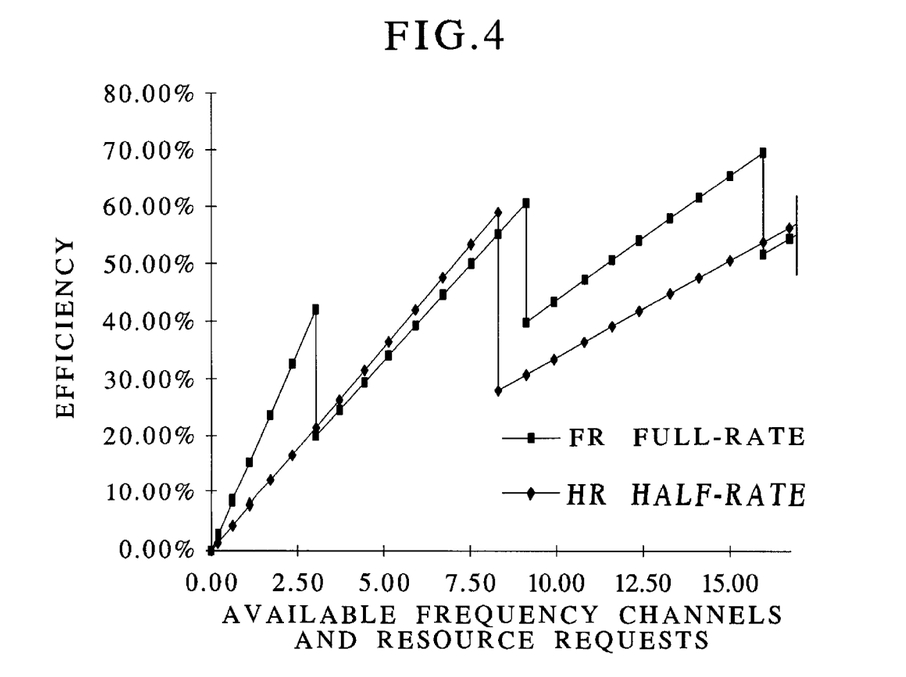
FIG. 4 shows the efficiency of the utilization of the radio resources as a function of the frequency channels made available and the resource requests.

FIG. 4 illustrates the problems of the efficiency of the utilization of radio resources when additional frequency channels FKz are added. When a specific traffic-load-value requirement is exceeded, the traffic load values plotted on the ordinate require, by means of a further resource request, the addition of an additional frequency channel FKz. However, in the case of a single additional resource request, for example, a request for a call setup, the additional frequency channel FKz is utilized only to an inadequate degree. This leads to a considerable decline in the efficiency of the utilization of the resources, for example, for a GSM system using the time slot multiplexing method with a full-rate utilization of the frequency channels FK the addition of the second frequency channel FK in the case of a further call request leads to a drop in efficiency from approximately 45% to 20%, and from approximately 60% to 25% for half-rate utilization of the frequency channels. In accordance with the method according to the present invention, the seven or 15 time slots which are unused in these cases could be apportioned to further radio coverage areas FB from which further call requests may also have been submitted.

Various possible ways of realizing the base station BS according to the present invention with, for example, three sectors and thus three radio coverage areas FB which are realized by one transmission device UE in each case are given below by means of block diagrams of the transmitting component TX in FIGS. 5 through 9 and of the receiving component RX in FIGS. 10 and 11. However, it is also possible for the base station BS to have two or four or more radio coverage areas FB; also, the additional frequency channel FKz may only be made available to a portion of the radio coverage areas FB. For applications within the GSM system, the solutions described below can be realized both in full-rate mode and in half-rate mode.

Figure 5:
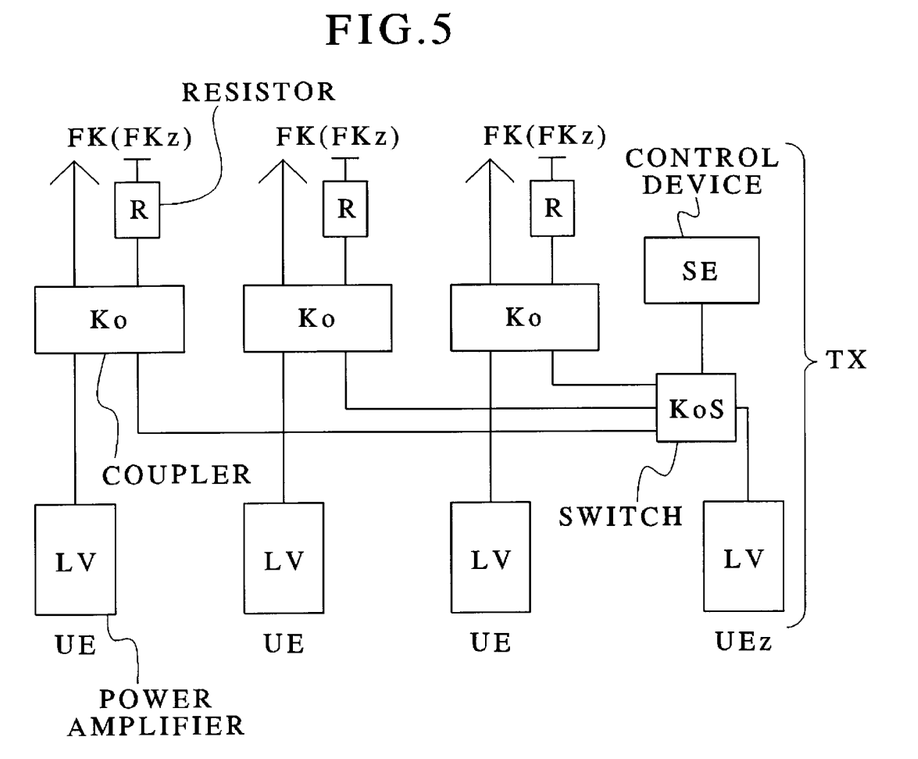
FIGS. 5 through 9 show block diagrams of parts of the transmitting component of the transmission devices of the base station.

In FIG. 5, the power amplifiers LV of the transmission units UE and of the additional transmission units UEz generate the transmission energy for the corresponding frequency channels FK. the power amplifier LV of the additional transmission unit UEz is connected to a magnetically controlled coaxial switch KoS. This coaxial switch KoS is controlled in accordance with the time slots by a control device SE. The transmission energy of the additional frequency channel FKz is distributed to the couplers Ko of the transmission devices UE by the coaxial switch KoS in order to be broadcast at their antenna elements. Couplers Ko which are associated with the transmission units UE are each connected at the input end to the power amplifiers LV and to a terminal of the coaxial switch KoS. The couplers Ko can also be embodied as a ring feeder. A portion of the respective transmission energy is absorbed in each case by a terminating resistor R. The combined transmission energies of the frequency channels FK and of the additional frequency channel FKz are broadcast by the antennas of the respective transmission units UE, the said antennas being each connected to the coupler Ko.

Figure 6:
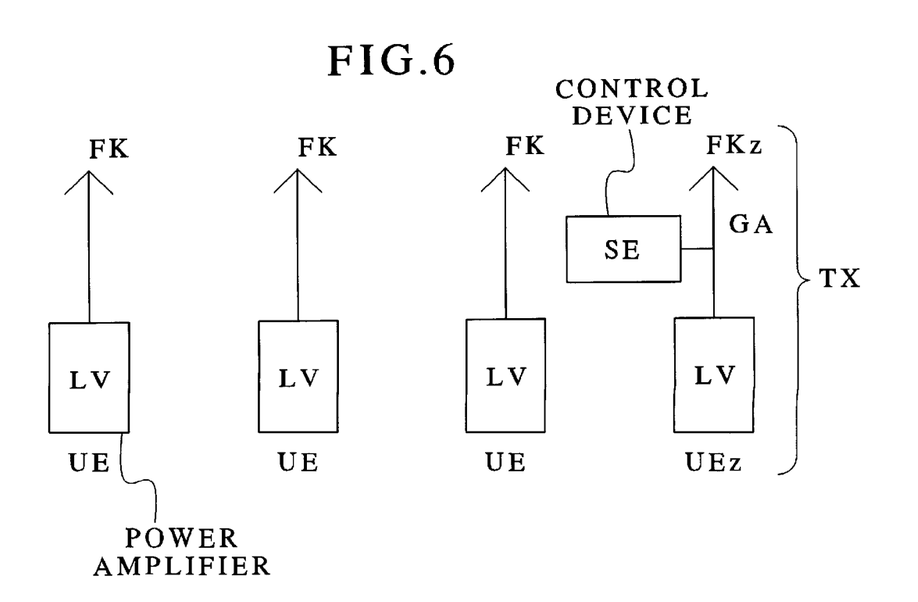

In the base station BS in accordance with FIG. 6, the power amplifiers LV of the transmission units UE are connected directly to the corresponding antenna elements and they realize the associated radio coverage areas FB by making available frequency channels FK. A power amplifier LV of an additional transmission unit UEz is connected to a phase-controlled array antenna GA. Under the control of a control device SE, the transmission energy of the additional frequency channel FKz can be used by means of appropriate phase control of the individual antenna elements of the group antenna GA for a plurality of radio coverage areas FB by switching over in accordance with the time slots. the radiation characteristic of the array antenna GA is aligned with in each case one radio coverage area FB for each time slot. However, according to this embodiment of the base station BS according to the present invention (in contrast with the base station BS in accordance with FIG. 5), it is not necessary to switch any high-frequency transmission energy.

Figure 7:
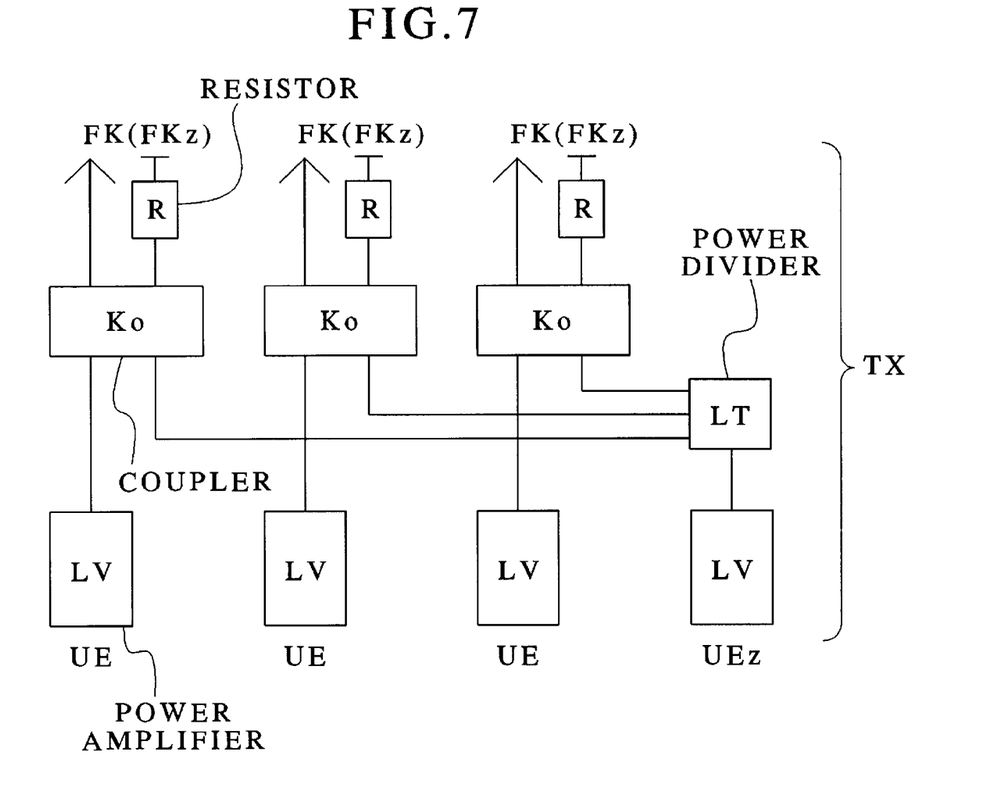

For the base station BS in accordance with FIG. 7, in the transmitting component TX in the transmission units UE the power amplifiers LV are each connected to a coupler Ko, which can also be realized by means of a ring feeder. Furthermore, the couplers Ko are each connected to a power amplifier LV of an additional transmission device UEz via a power divider LT. In the power divider LT, the transmission energy of the additional frequency channel FKz is apportioned to the three couplers Ko of the transmission units UE. A portion of the transmission energies is absorbed in each case in a terminating resistor R and the combined transmission energy of the frequency channels FK of the transmission devices UE and of the additional frequency channel FKz of the additional transmission device UEz is fed in each case to the antenna elements for broadcasting. This solution does not require any control elements whatsoever, however, in contrast with the base stations according to FIGS. 5 and 6 a frequency channel FK which carries the system information cannot be replaced after being lost in one of the radio coverage areas FB.

Figure 8:
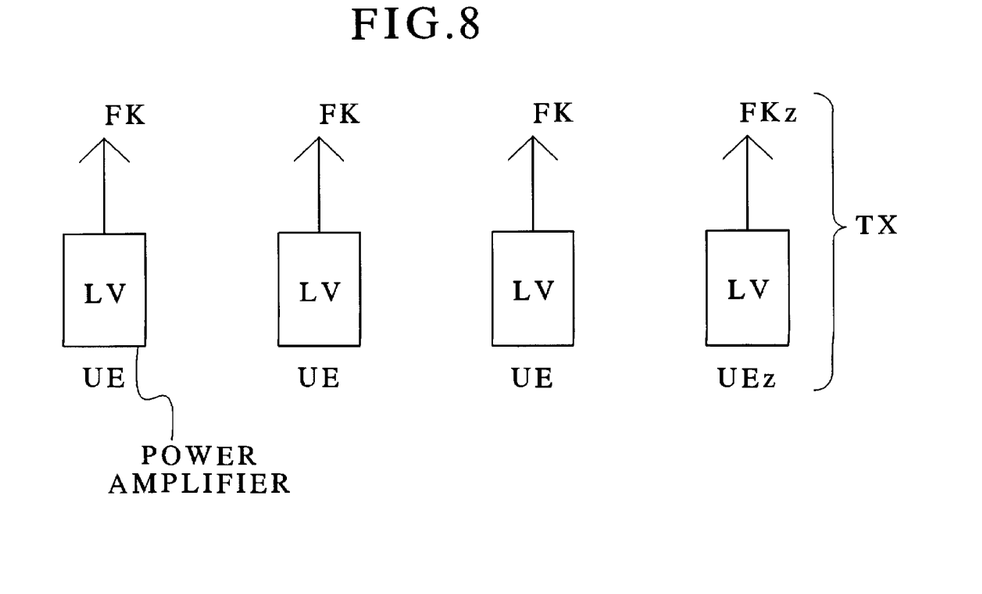

A further possible way of realizing a base station BS according to the present invention is explained in FIG. 8. An additional transmission device UEz for generating an additional frequency channel FKz with power amplifier LV and antenna supplements the existing transmission devices UE in order to generate frequency channels FK with power amplifier LV and antenna such that the antenna of the additional transmission device UEz broadcasts omnidirectionally or has a radiation characteristic which covers at least a plurality of radio coverage areas FB. Here too, no control elements or active elements are required, but additional antenna equipment is necessary and an organization frequency channel cannot be replaced.

Figure 9:
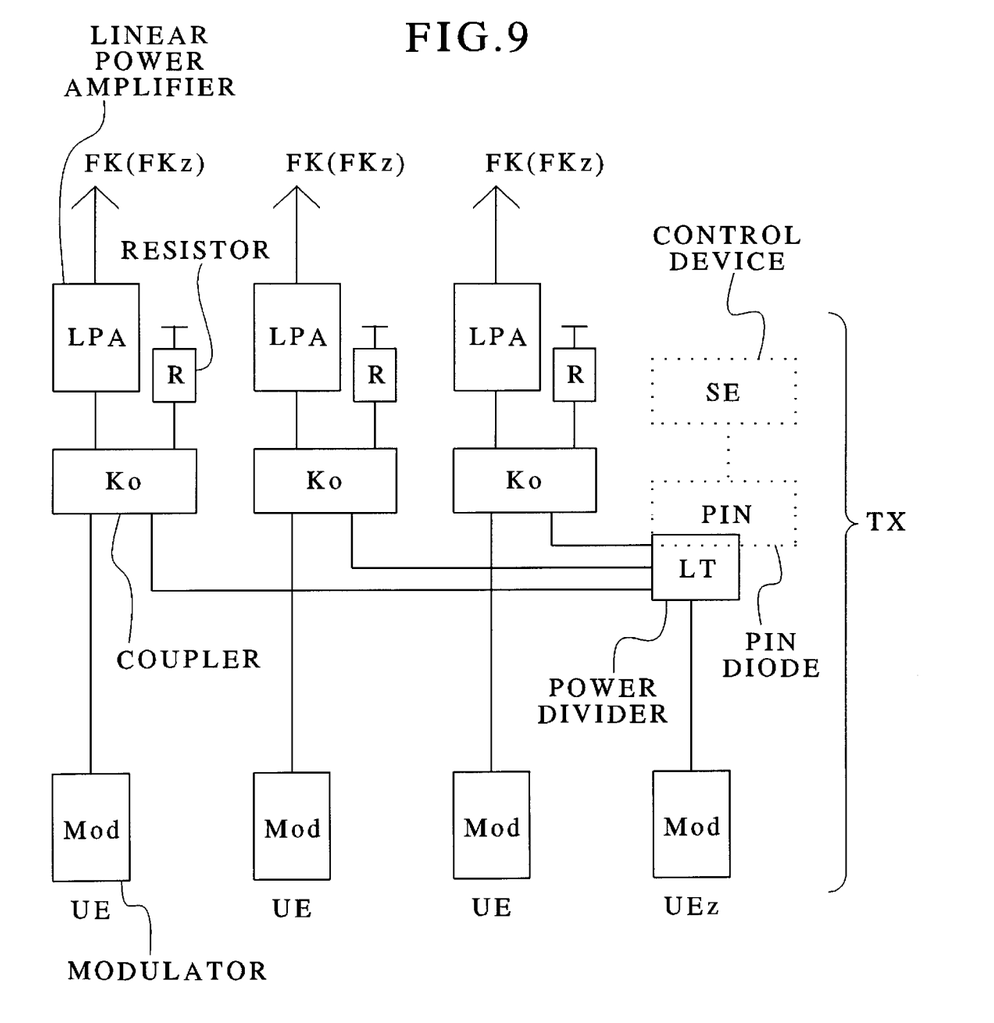

The base station BS in accordance with FIG. 9 is of similar design to that according to FIG. 7. However, here the combination of the transmission energy of the frequency channels FK and of the additional frequency channel FKz takes place before output amplification. The transmission energy which is emitted by the modulators Mod of the transmission devices UE is fed in each case to couplers Ko which are also connected at the input end to a power divider LT. The power divider LT apportions the transmission energy of the frequency channel FKz generated in the modulator Mod of the additional transmission device UEz to the three transmission devices UE. Since the transmission energy before the output amplification is not so powerful, the power divider LT can also be replaced by a PIN diode PIN controlled by a control device SE. At the output end of the couplers Ko, in each case a portion of the combined transmission energy of the frequency channels FK is absorbed in terminating resistors R and a further portion is subjected to output amplification in linear power amplifiers LPA and fed to the corresponding antenna elements of the transmitting component TX. If a PIN diode PIN is used, in this embodiment of the transmitting component TX an organization channel which has been lost can also be replaced.

Figure 10:
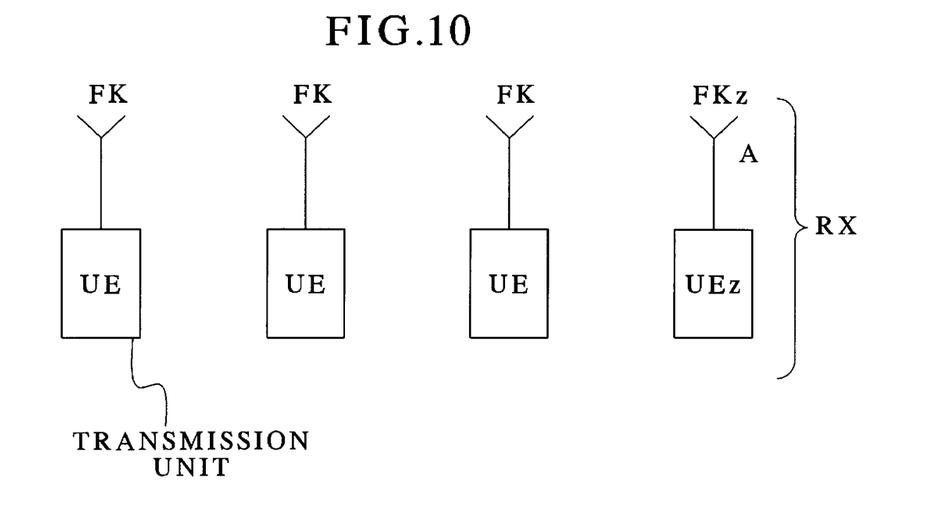
FIGS. 10 through 11 show block diagrams of parts of the reception component of the transmission devices of a base station.

A solution for the receiving component RX of a base station BS according to the present invention is illustrated in FIG. 10. In parallel with the receiving components of the transmission devices UE for receiving the frequency channels FK with the associated antenna elements, an additional transmission device UEz is promoted which is connected to an additional antenna A and executes the evaluation of the additional frequency channel FKz. This solution is extremely simple but requires additional antenna equipment.

Figure 11:
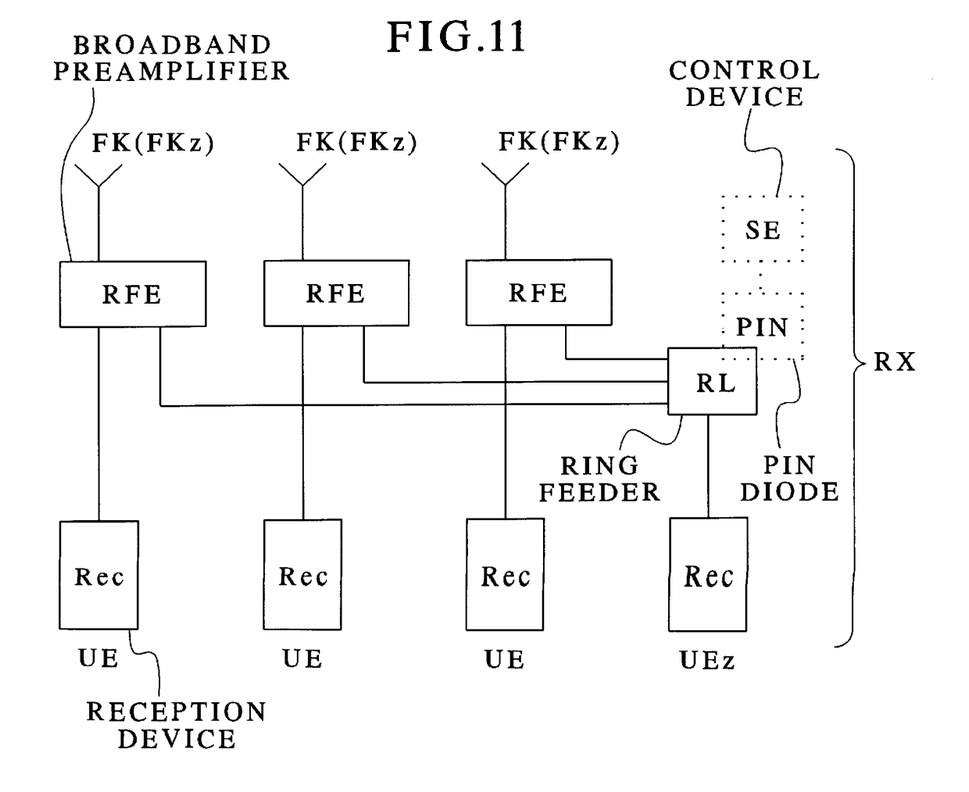

An additional antenna is dispensed with in the base station BS according to FIG. 11. The reception energies of the frequency channels FK are received in the antennas of the respective transmission devices UE and fed in each case to the broadband preamplifiers RFE. A portion of the reception energy is fed from the preamplifier into the corresponding receives Rec of the transmission devices UE and, in addition, a further portion of the reception energy is fed into a ring feeder RL. The ring feeder RL for the reception energies which originate from the various radio coverage areas FB feeds the combined reception energies into the receiving component Rec of the additional transmission device UEz. The filtering and amplification of the signals of the corresponding frequency channels FK, FKz takes place respectively in the reception devices Rec. The ring feeder RL can also be replaced by a PIN diode PIN controlled by a control device SE. These solutions do not require any additional outlay in terms of antenna equipment but additional losses occur and a reduction in reception sensitivity is experienced.

The various solutions presented for the transmitting component TX and the receiving component RX can be combined as desired; they merely have to be tuned to the same radio coverage areas FB. Particularly favorable combination possibilities are to implement a separate antenna in each case in the transmitting and receiving component TX/RX for the additional frequency channel FKz and to transmit with a power divider LT according to the solutions in FIG. 7 or FIG. 9, and to receive with a receiving component RX according to FIG. 11 with a PIN diode PIN.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A base station having a plurality of transmission devices in a radio communication system, the transmission devices each realizing a radio coverage area comprising;

a transmitting component, a receiving component and a control device for controlling said transmitting component and said receiving component;

spectrum resources which are provided by an additional transmission device and which are assigned by the control device;

said spectrum resources, in the event of previously available radio resources not being available, being commonly used for a further resource request for at least two transmission devices of the plurality of transmission devices;

the additional transmission device generating an additional frequency channel and connected in the transmitting component to a coaxial switch, the additional transmission device being for common use of the additional frequency channel by the at least two transmission devices, the coaxial switch switching over transmission energy in accordance with time slots; and the coaxial switch connected to each of the transmission devices of associated ring feeders or couplers, and the transmission energy of the additional frequency channel being combined in the ring feeders or couplers with transmission energies of the respective transmission devices.

2. The base station according to claim 1, wherein the base station further comprises a ring feeder which is tuned to the frequency of the additional frequency channel, is connected to the transmission devices and in which received signals of the additional frequency channel are combined after broadband reception in respective transmission device is provided in the receiving component.

3. The base station according to claim 1, wherein the base station further comprises, in the receiving component, a PIN diode which, after broadband reception in a respective transmission device, combines received signals of the additional frequency channel, controlled in accordance with time slots by the control device, for further evaluation.

4. A base station having a plurality of transmission devices in a radio communication system, the transmission devices each realizing a radio coverage area, comprising;

a transmitting component, a receiving component and a control device for controlling said transmitting component and said receiving component;

spectrum resources which are provided by an additional transmission device and which are assigned by the control device;

said spectrum resources, in the event of previously available radio resources not being available, being commonly used for a further resource request for at least two transmission devices of the plurality of transmission devices;

the additional transmission device generating an additional frequency channel and connected in the transmitting component to an additional phase-controlled array of antenna elements so that, under the control of the control device, the phase controlled array antenna aligns radiation characteristic of the additional frequency channel with radio coverage area of at least two transmission devices of the plurality of transmission devices in accordance with time slots.

5. A bass station having a plurality of transmission devices in a radio communication system, the transmission devices each realizing a radio coverage area, comprising;

a transmitting component, a receiving component and a control device for controlling said transmitting component and said receiving component;

spectrum resources which are provided by an additional transmission device and which are assigned by the control device;

said spectrum resources, in the event of previously available radio resources not being available, being commonly used for a further resource request for at least two transmission devices of the plurality of transmission devices;

the additional transmission device generating an additional frequency channel and connected to a power divider so that transmission energy of the additional frequency channel is apportioned via the power divider to at least two further transmission devices; and additional ring feeders or couplers arranged in the further transmission devices and connected to the power divider, transmission energy of the additional frequency channel being combined with transmission energies of respective transmission devices.

6. A bass station having a plurality of transmission devices in a radio communication system, the transmission devices each realizing a radio coverage area, comprising;

a transmitting component, a receiving component and a control device for controlling said transmitting component and said receiving component;

spectrum resources which are provided by an additional transmission device and which are assigned by the control device;

said spectrum resources, in the event of previously available radio resources not being available, being commonly used for a further resource request for at least two transmission devices of the plurality of transmission devices;

the additional transmission device generating an additional frequency channel and apportioning transmission energy of the additional frequency channel to at least two further transmission devices via a power divider or a PIN diode before output amplification in the transmitting component; and ring feeders or couplers connected to the power divider or the PIN diode in the other transmission devices, in which ring feeders or couplers the transmission energy of the additional frequency channel is combined with transmission energies of each respective transmission device, after which the transmission energies are amplified in a linear power amplifier.

7. The base station according to claim 6, wherein the control device is structured such that the addition of the additional frequency channel to a specific radio coverage area is controlled by the control device.

8. The base station according to claim 7, wherein an additional frequency channel is switched, by the control device as a replacement for a frequency channel which transmits system information and which has been lost.

9. A base station having a plurality of transmission devices in a radio communication system, the transmission devices each realizing a radio coverage area comprising;

a transmitting component, a receiving component and a control device for controlling said transmitting component and said receiving component;

spectrum resources which are provided by an additional transmission device and which are assigned by the control device;

said spectrum resources, in the event of previously available radio resources not being available, being commonly used for a further resource request for at least two transmission devices of the plurality of transmission devices;

an additional antenna coupled to an evaluation circuit, which operates to evaluate a received component of additional frequency channel detected by the additional antenna, which realizes radio coverage areas of at least two transmission devices of the plurality of transmission units.

* * * * *